United States Patent
Bramsløw

(10) Patent No.: US 11,564,048 B2
(45) Date of Patent: Jan. 24, 2023

(54) SIGNAL PROCESSING IN A HEARING DEVICE

(71) Applicant: Oticon A/S, Smørum (DK)

(72) Inventor: Lars Bramsløw, Smørum (DK)

(73) Assignee: Oticon A/S, Smørum (DK)

( * ) Notice: Subject to any disclaimer, the term of this patent is extended or adjusted under 35 U.S.C. 154(b) by 66 days.

(21) Appl. No.: 17/119,581

(22) Filed: Dec. 11, 2020

(65) Prior Publication Data

US 2021/0185465 A1    Jun. 17, 2021

(30) Foreign Application Priority Data

Dec. 12, 2019  (EP) ..................... 19215630

(51) Int. Cl.
*H04R 25/00*   (2006.01)
*G06N 3/04*    (2006.01)
*G06N 3/08*    (2006.01)

(52) U.S. Cl.
CPC ............... *H04R 25/70* (2013.01); *G06N 3/04* (2013.01); *G06N 3/08* (2013.01); *H04R 25/554* (2013.01); *H04R 2225/025* (2013.01)

(58) Field of Classification Search
CPC . H04R 25/70; H04R 25/554; H04R 2225/025
See application file for complete search history.

(56) References Cited

U.S. PATENT DOCUMENTS

| | | | | |
|---|---|---|---|---|
| 10,706,856 | B1* | 7/2020 | Korjani | ............... G06N 3/0454 |
| 2016/0183012 | A1* | 6/2016 | Pedersen | ............. H04R 25/554 381/318 |
| 2019/0151661 | A1* | 5/2019 | Li | ..................... A61N 1/36039 |

OTHER PUBLICATIONS

Jeff Bondy et. al."A novel signal-processing strategy for hearing-aid design: neurorcompensation" (2004), 1239-1253.*

(Continued)

*Primary Examiner* — Sunita Joshi

(74) *Attorney, Agent, or Firm* — Birch, Stewart, Kolasch & Birch, LLP

(57) ABSTRACT

A method of defining and setting a nonlinear signal processing of a hearing device, e.g. a hearing aid, by machine learning is provided. The hearing device being configured to be worn by a user at or in an ear or to be fully or partially implanted in the head at an ear of the user, the method comprising providing at least one electric input signal representing at least one input sound signal from an environment of a hearing device user, determining a normal-hearing representation of said at least one electric input signal based on a normal-hearing auditory model, determining a hearing-impaired representation of said at least one electric input signal based on a hearing-impaired auditory model, determining optimised training parameters by machine learning, where determining optimised training parameters comprises iteratively adjusting the training parameters, and comparing the normal-hearing representation with the hearing-impaired representation to determine a degree of matching between the normal-hearing representation and the hearing-impaired representation, until the degree of matching fulfils predetermined requirements, and, when the degree of matching fulfils the predetermined requirements, determining corresponding signal processing parameters of the hearing device based on the optimised training parameters. A hearing device is further provided.

20 Claims, 8 Drawing Sheets

(56) References Cited

OTHER PUBLICATIONS

Jeff Bondy et al. "A novel signal-processing strategy for hearing aid design: neurocompensation"(2004), 1239-1253 (Year: 2004).*
Bengio, "Learning Deep Architectures for AI," Foundations and Trends in Machine Learning, vol. 2, Issue 1, 2009, pp. 1-11, 117-131 (35 pages total).
Bernstein et al., "Spectrotemporal Modulation Sensitivity as a Predictor of Speech Intelligibility for Hearing-Impaired Listeners," J. Am. Acad. Audiol., vol. 24, No. 4, 2013, pp. 293-306.
Bisgaard et al., "Standard Audiograms for the IEC 60118-15 Measurement Procedure," Trends in Amplification, vol. 14, No. 2, 2010, pp. 113-120 (9 pages total).
Bramsløw, "An Objective Estimate of the Perceived Quality of Reproduced Sound in Normal and Impaired Hearing," Acta Acustica United with Acustica, vol. 90, 2004, pp. 1007-1018.
Carney, "Fluctuation contrast and speech-on-speech masking: Model midbrain responses to simultaneous speech," Proceedings of the International Symposium on Auditory and Audiological Research, vol. 6, Aug. 2017, pp. 75-82.
Chen et al., "A new model for calculating auditory excitation patterns and loudness for cases of cochlear hearing loss," Hearing Research, vol. 282, 2011 (published online Sep. 29, 2011), pp. 69-80.
Goodfellow et al., "Deep Learning," Deep Learning Book, pp. 164-167, 326-329 (17 pages total).
Grange et al., "Cochlear Implant simulator with independent representation of the full spiral ganglion," JASA Express Letters, vol. 142, No. 5, Nov. 2017, 7 pages total.
Hohmann et al., "Frequency analysis and synthesis using a Gammatone filterbank," Acta Acustica United with Acustica, vol. 88, 2002, pp. 433-442.
Jepsen et al., "Characterizing auditory processing and perception in individual listeners with sensorineural hearing loss," J. Accoust. Soc. Am., vol. 129, No. 1, Jan. 2011, pp. 262-281 (21 pages total).
Jepsen et al., "Characterizing auditory processing and perception in individual listeners with sensorineurla hearing loss," J. Accoust. Soc. Am., vol. 129, No. 1, Jan. 2011, pp. 262-281 (21 pages total).
Moore et al., "New Version of the TEN Test with Calibrations in dB HL," Ear & Hearing, vol. 25, No. 5, Oct. 2004, pp. 478-487.
Stone et al., "Simplified measurement of auditory filter shapes using the notched-noise method," British Journal of Audiology, vol. 26, 1992, pp. 329-334 (7 pages total).
Zeng et al., "Coupled Deep Autoencoder for Single Image Super-Resolution," IEEE Transactions of Cybernetics, 2015, pp. 1-11 (12 pages total).
Zilany et al., "Modeling auditory-nerve responses for high source pressure levels in the normal and impaired auditory periphery," J. Accoust. Soc. Am., vol. 120, No. 3, Sep. 2006, pp. 1446-1466 (22 pages total).
Zwicker et al., "Psychoacoustics: Facts and Models," Springer Series in Information Sciences, 1990, 4 pages total.
Bondy et al., "A novel signal-processing strategy for hearing-aid design: neurocompensation", Signal Processing, 2004, vol. 84, pp. 1239-1253.
Haruta et al., "Deep Neural Network-based fitting prescription for hearing aids: the efficacy of the proposed system", International Hearing Aid Conference 2016, total 1 page.
Mondol et al., "A Machine Learning Approach to Fitting Prescription for Hearing Aids", Electronics, 2019, vol. 8, No. 7, pp. 1-13.

* cited by examiner

SIGNAL PROCESSING IN A HEARING DEVICE

SUMMARY

The present application relates to hearing devices, e.g. hearing aids or headsets, configured to be worn by a user at or in an ear or to be fully or partially implanted in the head at an ear of the user.

A Hearing Device:

A cochlear (sensorineural) hearing loss leads to many degradations in the inner ear (cochlea), thus changing the nonlinear behaviour of the healthy cochlea in many ways. The dynamic range of hearing is reduced, the spectral and temporal resolution is poorer, and consequently, the ability to hear and recognize speech in noise is degraded. This is to some extent addressed by the non-linear compression and noise reduction in modern hearing aids.

In hearing research, both normal and impaired hearing has been studied by use of auditory models. These models are based on the physiology of the ear (physiological models), the psychoacoustics (behavioural models) or a combination of the two. All these models transform the input signal to some kind of 'neural' or 'auditory' representation, and the processing steps in this transformation are normally highly nonlinear. These models are not bidirectional, so they cannot be used directly to 'invert' the hearing or derive a mapping of the signal processing required to transform the impaired auditory representation into the normal auditory representation.

In cochlear implants, the stimulation of the auditory nerve is done via an electrode inserted into the ear. Compared to the number of available synapses in the cochlea, the implant has very few electrodes, e.g. 24 electrodes. Each electrode stimulates a range of nearby synapses, and due to current spread this stimulation is not very specific. And due to the simple speech processing in the cochlear implant and the limited number of channels and electrodes, plus the current spread, the sound perception for a cochlear implant user is severely degraded compared to normal hearing.

Hearing loss is commonly measured as the hearing threshold of a hearing-impaired user for pure tones (as reflected in an audiogram), and the hearing-impaired model should allow for an average setting of all model parameters based on the audiogram. However, this does not capture all aspects of the individual hearing impairment of a hearing device user.

In an aspect of the present application, a method of defining and setting a nonlinear signal processing of a hearing device (e.g. for compensating a user's hearing impairment) is provided. The hearing device may be a hearing aid or a headset.

The method of defining and setting the nonlinear signal processing of the hearing device may be carried out by machine learning (e.g. supervised machine learning).

The machine learning may comprise providing a neural network, such as a deep neural network.

The method may be a method of training a neural network for defining and setting a nonlinear signal processing of a hearing device.

The hearing device may be configured to be worn by a user at or in an ear or to be fully or partially implanted in the head at an ear of the user.

The defining and setting a nonlinear signal processing and/or the training of a neural network may be performed during the product manufacturing of the hearing device, and/or may be performed after manufacturing of the hearing device, and/or may be performed after the delivery of the hearing device to the hearing device user (e.g. during use of the hearing device).

The method may comprise providing at least one electric input signal. The electric input signal may represent at least one input sound signal from an environment of a hearing device user. The at least one input sound signal may comprise a speech component originating from one or more speech sound sources. The electric input signal may comprise sound comprising noise signal components. The noise signal components may arise from one or more noise sound sources. The electric input signal may represent sound in an environment of the user of the hearing device. The at least one electric input signal may comprise a large corpus of relevant electric input signals from the daily life of a hearing device user. For example, the at least one electric input signal may comprise speech combined with many types of background noises, may comprise clean speech, and/or may comprise music, etc.

The method may comprise determining a normal-hearing representation, e.g. a 'neural representation' similar to the signal in the auditory nerve [9] or an 'excitation pattern' similar to a psychoacoustic masking pattern [10] of said at least one electric input signal. The normal-hearing representation may be determined based on a normal-hearing auditory model. A normal-hearing representation may refer to the perception of the audio of the at least one electric input signal, which is assumed to be what is available to the brain in a normal-hearing listener.

Determining a normal-hearing representation may refer to picking or choosing one or more electric input signals and the corresponding representation. The one or more electric input signals may originate from a library of speech sound signals and/or noises sound signals and/or other sound signals, e.g. comprising music, sound from a television, electronic sound, and/or animal sound. Hereby, a good default version of a normal-hearing representation is available at the time of initial training.

The method may comprise determining a hearing-impaired representation of said at least one electric input signal. The hearing-impaired representation may be based on a hearing-impaired auditory model. A hearing-impaired representation may refer to the perception of the audio of the at least one electric input signal, which is assumed to be what is available to the brain in the hearing-impaired listener (e.g. hearing device user). The primary clinical description of an individual hearing loss is the audiogram (e.g. [11]), where 0 dB HL represents normal hearing and X dB HL represents X dB hearing loss. Consequently, the audiogram may be used as individualized input parameters to the auditory model. The audiogram may comprise one or more of an age-related hearing loss, a noise induced hearing loss, an inherited hearing loss, a reverse slope hearing loss, and a cookie bite hearing loss.

Determining a hearing-impaired representation may refer to picking or choosing one or more electric input signals and the individual or generic audiogram (e.g. prototype audiograms [11]), which will be effected by the degree of hearing loss as described by an audiogram (e.g. prototype audiograms). The one or more electric input signals may originate from a library of speech sound signals and/or noise sound signals and/or other sound signals, e.g. comprising music, sound from a television, electronic sound, and/or animal sound. Hereby, a good default version of the hearing-impaired representation is available at the time of initial training.

The hearing-impaired representation, the normal-hearing representation, and the corresponding auditory models may be used during the initial training (and possible further training), but do not have to be stored on the hearing device.

The method may comprise determining optimized training parameters by machine learning.

The method may comprise determining optimized training parameters (weights) of a neural network (an algorithm).

Machine learning may be for defining and setting the nonlinear signal processing of a hearing device.

The neural network may be for defining and setting the nonlinear signal processing of a hearing device by training the neural network.

The machine learning and/or neural network may be configured for determining required enhancing and/or attenuating of the at least one electric input signal at one or more frequencies. For example, the neural network may be trained in the product development phase based on prototype audiograms and a library of corresponding sound signals so that a good default version of the parameters of the neural network (and of the signal processing parameters) is available after the time of initial training of the neural network.

Determining optimized training parameters may comprise iteratively adjusting the training parameters.

Training the neural network may comprise iteratively adjusting the training parameters of the neural network.

Determining optimized training parameters and/or training the neural network may comprise iteratively comparing the normal-hearing representation with the hearing-impaired representation to determine a degree of matching (error measure) between the normal-hearing representation and the hearing-impaired representation.

Determining optimized training parameters and/or training the neural network may comprise iteratively adjusting the parameters of the neural network and comparing the normal-hearing representation with the hearing-impaired representation to determine a degree of matching between the normal-hearing representation and the hearing-impaired representation until the degree of matching fulfills predetermined requirements, e.g. based on a cost- or loss-function, e.g. Mean Squared Error (MSE).

Parameters of the neural network may refer to weights of a neural network.

Comparing may comprise comparing one or more of the parameters constituting the normal-hearing representation and the hearing-impaired representation as defined/determined by the applied respective auditory model(s).

Predetermined requirements may refer to one or more predetermined values. For example, predetermined requirements may constitute that the deviation between the normal-hearing representation and the hearing-impaired representation in total (at all compared values, for example frequencies) must be below a predetermined value (such as <20%, <10%, <5%, <2%, or other). For example, predetermined requirements may constitute that the deviation between the normal-hearing representation and the hearing-impaired representation at each of the compared values (for example at each frequency) must be below a predetermined value (such as <20%, <10%, <5%, <2%, or other).

Predetermined requirements may comprise minimizing the cost function, i.e. minimize the difference between the normal-hearing representation and the hearing-impaired representation, to be below a predetermined value.

The method may comprise, when the degree of matching fulfills the predetermined requirements, determining corresponding signal processing parameters of the hearing device based on the optimized training parameters.

Signal processing parameter may refer to gain (e.g. incl. providing a mask), noise reduction, enhancement (e.g. spectral shaping) and/or other signal processing related parameters.

Determining corresponding signal processing parameters of the hearing device may comprise converting the optimized parameters of the neural network into corresponding signal processing parameters of the hearing device. For example, determining corresponding signal processing parameters of the hearing device may comprise converting the optimized weights of the neural network into corresponding signal processing parameters of the hearing device.

Thereby, an output signal may be provided in the ear of a hearing-impaired user with an improved similarity to a corresponding normal-hearing perception.

The method comprises providing, based on the signal processing parameters, at least one output signal representing stimuli perceivable by a hearing device user as sound. Providing, based on the signal processing parameters, at least one output signal may comprise enhancing and/or amplifying the electric input signal to provide the output signal.

Providing at least one electric input signal may comprise providing a plurality of electric input signals. For example, at least two electric input signals may be provided. For example, at least three electric input signals may be provided.

The plurality of electric input signals may comprise a large corpus of relevant electric input signals from the daily life of the hearing device user, e.g. speech combined with different types of background noises, clean speech, music etc. The relevant electric input signals may be stored on a memory device as a library of audio signals and corresponding audiograms. Thereby, a good hearing-impaired representation (and corresponding signal processing parameters) is available after the initial training.

The plurality of electric input signals may be provided one at a time. Hereby, the training parameters of the neural network and the corresponding signal processing parameters may be determined for a first electric input signal and be further adjusted for a second electric input signal, etc., until the neural network has been trained on all the plurality of electric input signals.

The plurality of electric input signals may be provided two or more at the same time. Hereby, the training parameters of the neural network and the corresponding signal processing parameters may be determined based on two or more electric input signals at a time, which is time efficient, until the neural network has been trained on all the plurality of electric input signals.

The method may further comprise transforming the electric input signal into a spectrum.

The method may transform the electric input signal into a spectrum by use of an analysis filter bank.

The method may transform the electric input signal into a spectrum by Fourier transforming the electric input signal.

The hearing device, e.g. an input unit, and/or the antenna and transceiver circuitry may comprise a TF-conversion unit for providing a time-frequency representation of the at least one electric input signal. The time-frequency representation may comprise an array or map of corresponding complex or real values of the signal in question in a particular time and frequency range. The TF conversion unit may comprise an analysis filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. Thereby, a frequency resolved electric input signal is provided.

The analysis filter bank may also be designed to mimic the frequency resolution similar to that of the human hearing, for instance a gammatone filter bank ([12]).

The normal-hearing threshold of hearing and the hearing-impaired threshold of hearing may be parameterized by audiograms.

An audiogram may represent a normal-hearing user by being close to zero dB HL (e.g. max 15 dB HL).

An audiogram may represent a hearing-impaired user by having values larger than zero dB HL (e.g. >30 dB HL).

The physiology of an ear (physiological models), the psychoacoustics (behavioural models), or a combination of the two may be parameterized by a normal-hearing audiogram and/or a hearing-impaired audiogram.

Thereby, input parameters which are easy to compare and clinically accepted are provided.

The determining optimized training parameters by machine learning may comprise determining optimized training parameters of a neural network by training the neural network.

The neural network may be a deep neural network.

A neural network and/or a deep neural network provides the possibility of performing the computationally intensive training.

A deep neural network (DNN) may transform the input signal using N samples/coefficients into the same type of N output samples/coefficients. The neural network may be a traditional feed-forward DNN [1] with no memory, or a Long Short-Term Memory (LSTM) or Convolutional Recurrent Neural Network (CRNN) [1] which both contain memory and thus are able to learn from previous input samples.

The DNN may comprise an auto-encoder.

When using a traditional feed-forward DNN, it may also be modified to be a so-called auto encoder [2] in which the middle layer of the network has a smaller dimension than the input and output dimension N. This transforms the input into a simpler representation that contains the essential features, which may then be modified to obtain a given result. These denoising and super-resolution auto-encoders have successfully been used to enhance noisy and blurry images back to noise-free high-resolution images [3].

The method may further comprise providing at least one supra-threshold measure.

By providing at least one supra-threshold measure as input to the auditory model, the ability of the neural network to adjust its parameters until the degree of matching between the normal-hearing representation and the hearing-impaired representation is optimal, is increased.

Determining a hearing-impaired representation of said at least one electric input signal may be further based on said at least one supra-threshold measure.

Hearing loss is commonly measured as the hearing threshold of a hearing-impaired user for pure tones (audiogram), and the hearing-impaired model should allow for an average setting of all other model parameters based on the audiogram. However, this does not capture all aspects of the individual hearing impairment. Supra-threshold measures may characterize e.g. broadened auditory filters [4], loss of cochlear compression [5] or spectro-temporal modulation detection [6]. Accordingly, the parameters in the hearing-impaired representation (impaired auditory model) may be further based on (be adapted to) the supra-threshold measures. The supra-threshold measures may be individual measurements (customized measurements) [5]. The supra-threshold measures may provide an individualized (customized) training of the neural network of the hearing device.

In a physiological model, the cochlear compression may for instance be measured and then inserted in the model [5]. Another important factor in the model is to estimate the relative loss of inner and outer hair cells from the total hair cell loss (estimated from the audiogram). This may be estimated via the Threshold equalizing noise (TEN) test, where the hearing thresholds are measured using masking noise [15]. In psychoacoustical models, the equivalent rectangular bandwidth (ERB) may be measured using the notched-noise method [4].

Accordingly, the training of the neural network may be further based on the at least one supra-threshold measure obtained from the hearing device user. Hereby, the neural network (and thereby the hearing device) may be further trained to accommodate individual hearing device user needs. The further training of the neural network may be termed as 'transfer learning' [1]. The further training of the neural network may be carried out during production, during initial fitting of the hearing device to the user, and/or after the hearing device user has worn the hearing device for a period of time.

Further training of the neural network may be carried out after the hearing device user has started using the hearing device and audio samples (measurements) of the actual sound environments encountered by the hearing device user in his/her daily life has been collected.

The at least one supra-threshold measure may comprise broadened auditory filters.

The at least one supra-threshold measure may comprise loss of cochlear compression.

The at least one supra-threshold measure may comprise spectro-temporal modulation detection.

The at least one supra-threshold measure may comprise two or more of broadened auditory filters, loss of cochlear compression, and spectro-temporal modulation detection.

The normal-hearing auditory model and the hearing-impaired auditory model may be based on the same auditory model.

The method may further comprise providing at least one audiogram.

The determining of a hearing-impaired representation of said at least one electric input signal may further be based on said at least one audiogram.

The at least one audiogram may comprise hearing device user specific and/or generic audiograms.

The hearing-impaired auditory model may be based on the normal-hearing auditory model.

The output representation (parameters) of the normal-hearing auditory model and of the hearing-impaired auditory model may be identical. Thereby, an optimal training of the neural network may take place as the output parameters of the normal-hearing auditory model and of the hearing-impaired auditory model may be compared directly.

The normal-hearing auditory model and the hearing-impaired auditory model may be identical. Thereby, the required types of input parameters to the auditory models and the types of output parameters from the auditory models may be identical, but the specific input parameters (e.g. the values) to the auditory models may vary depending on whether the user is normal-hearing or hearing-impaired. Accordingly, an optimal training of the neural network may take place as the output parameters of the normal-hearing auditory model and of the hearing-impaired auditory model may be compared directly.

An audiogram, an auditory filter bandwidth, and/or cochlear compression measurement may be used to represent the parameters of the auditory model.

An error measure may be provided. The error measure may e.g. comprise a Root-Mean-Square (RMS) error across frequency channels or may be perceptually based on weighing different errors in the models differently. A simple example of perceptual weighting can be the frequency band weighting used in the Speech Intelligibility Index (SII) (ANSI S3.5, 2007), by which the relative importance of each frequency band for speech intelligibility is multiplied by the speech level in the same band and then summed across bands. Thereby, a pooled error measure across the entire training corpus may be used as outcome measure for the quality of the training and the matching to normal hearing. It is also possible to construct other error measures based on internal variables or representations in the auditory model, which will reflect the quality of the match between the normal-hearing and the hearing-impaired representation.

In an aspect of the present application, a hearing device is provided. The hearing device may comprise a hearing aid or a headset. The hearing device may be adapted to be worn in or at an ear of a user. The hearing device may be adapted to be fully or partially implanted in the head of the user.

The hearing device may comprise an input unit for receiving an input sound signal from an environment of a hearing device user. The hearing device may provide at least one electric input signal representing said input sound signal.

The hearing device may comprise an output unit for providing at least one set of stimuli perceivable as sound to the user based on processed versions of said at least one electric input signal.

The hearing device may comprise a processing unit

The processing unit may be connected to said input unit.

The processing unit may be connected to said output unit.

The processing unit may comprise signal processing parameters of the hearing device.

Said processing unit may comprise signal processing parameters of the hearing device to provide processed versions of said at least one electric input signal.

Said signal processing parameters may be determined based on optimized training parameters. The optimized training parameters may be determined by machine learning. The optimized training parameters may be of a neural network. The neural network may comprise a deep neural network.

The neural network may be trained according to the method as described above.

The training of the neural network may be carried out in a server, such as a cloud server. Thereby, the training may be distributed to a server and the hearing device may receive a trained version of signal processing parameters.

The training of the neural network may be carried out at least partly in an external device, such as a mobile device. Thereby, the training may be distributed at least partly to an external device and the hearing device may receive a trained version of signal processing parameters.

As training a neural network may be computationally intensive, carrying out the training outside the hearing device such as in a server or in an external device may reduce the power consumption in the hearing device.

The training or at least part of the training of the neural network may be carried out by the smartphone connected to the hearing device or the hearing device itself. Thereby, the hearing device may be configured to be trained during the initial production and fitting to the hearing device user, but also after the user has received the hearing device, without the hearing device has to connect to a server or an external device, or at least only has to connect to a server or an external device at intervals.

The neural network may provide processed versions of said at least one electric input signal. The neural network may e.g. be configured to provide (frequency and time dependent) signal processing factors to be applied to the at least one electric input signal (or a processed version thereof). The signal processing factors may be configured to compensate for a hearing impairment of a hearing device wearer (user). The hearing device may be configured to provide processed versions of said at least one electric input signal, by the neural network.

The hearing device may be configured to provide, based on the signal processing parameters, at least one set of stimuli perceivable as sound to the user based on processed versions of said at least one electric input signal.

The hearing device may be configured to provide, based on the signal processing parameters, at least one output signal, by the output unit, representing stimuli perceivable by a hearing device user as sound.

The processing unit may comprise a deep neural network trained according to the method as described above. The processing unit may be configured to provide processed versions of said at least one electric input signal. The processing unit may be configured to provide processed versions of said at least one electric input signal, based on a trained deep neural network as described above.

The hearing device may be configured to be further trained based on audio representing sound in an environment of the user.

The audio representing sound in an environment of the user may comprise speech from the user of from other persons, music, audio from a television, nature generated audio, etc.

A further training of the neural network for defining and setting the nonlinear signal processing of the hearing device may be carried out after the user has started using the hearing device. A further training may therefore be seen as a further customization of the hearing device to the user so that the hearing device provides/applies the optimal signal processing parameters in the environment of the user (i.e. in the environment the hearing device user normally operate).

The hearing device may comprise an analysis filter bank for transforming the electric input signal into a spectrum.

The analysis filter bank may be arranged after (downstream of) the input unit. The analysis filter bank may be arranged prior to the processing unit.

The hearing device may comprise a Fourier transformation of the electric input signal.

The analysis filter bank (and the hearing device) may be configured to provide a frequency resolved (spectrum) of the electric input signal.

The analysis filter bank (and the hearing device) may be configured to provide a frequency resolved version (spectrum) of the electric input signal to the processing unit.

The electric input signal may be provided directly in the time domain as a waveform or be transformed into the frequency domain using e.g. an analysis filter bank or a Fourier transform.

The processing unit may provide a normal-hearing representation (based on a normal-hearing auditory model) corresponding to the electric input signal to the neural network.

The processing unit may provide a hearing-impaired representation (based on a hearing-impaired auditory model) corresponding to the electric input signal to the neural network.

The hearing device may comprise a synthesis filter bank for transforming the at least one electric output signal into a signal representing stimuli perceivable by a hearing device user as sound.

The synthesis filter bank may be arranged post to the processing unit. The synthesis filter bank may be arranged prior to the output unit of the hearing device.

The synthesis filter bank may convert a frequency resolved signal (spectrum) to a time resolved signal.

The hearing device may comprise a gain module. The hearing device may comprise a mask.

The hearing device may comprise a gain module comprising a mask.

The hearing device may provide a non-linear time-varying gain. The gain module of the hearing device may provide a non-linear time-varying gain. The non-linear time-varying gain may be calculated/determined by machine learning, such as by a neural network, and be applied directly.

The hearing device (e.g. the gain module) may comprise a time-frequency masking. For example, a time-frequency masking may be used e.g. in relation to noise reduction and/or beamforming, in which multiplication factors (e.g. between 0 and 1, e.g. a binary mask) as a function of frequency and time may be applied.

The mask and/or gain module may be arranged prior to the output unit. The mask and/or gain module may be arranged prior to a synthesis filter bank. The mask may be arranged post to the processing unit providing the signal processing parameters of the hearing device.

The neural network may estimate a time-frequency mask which may then applied to the frequency resolved electric input signal (spectrum).

The hearing device may constitute or comprise a hearing aid.

The hearing aid may be configured to be fully or partially implanted in the head at an ear of the user.

The hearing device may constitute or comprise a headset. The hearing device may constitute or comprise an earphone.

The hearing device may constitute or comprise an ear protection device.

The hearing device may constitute or comprise a combination of a hearing aid, a headset, an earphone, and an ear protection device.

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing device) or a vibrator of a bone conducting hearing device. The output unit may comprise an output transducer. The output transducer may comprise a receiver (loudspeaker) for providing the stimulus as an acoustic signal to the user (e.g. in an acoustic (air conduction based) hearing device). The output transducer may comprise a vibrator for providing the stimulus as mechanical vibration of a skull bone to the user (e.g. in a bone-attached or bone-anchored hearing device).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceler (GSC) structure is an equivalent representation of the MVDR beamformer offering computational and numerical advantages over a direct implementation in its original form.

The hearing device may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing device. The direct electric input signal may represent or comprise an audio signal and/or a control signal and/or an information signal. The hearing device may comprise demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. The wireless link is established between two devices, e.g. between an entertainment device (e.g. a TV) and the hearing device, or between two hearing devices, e.g. via a third, intermediate device (e.g. a processing device, such as a remote control device, a smartphone, etc.). The wireless link is used under power constraints, e.g. in that the hearing device may be constituted by or comprise a portable (typically battery driven) device. The wireless link is a link based on near-field communication, e.g. an inductive link based on an inductive coupling between antenna coils of transmitter and receiver parts. The wireless link may be based on far-field, electromagnetic radiation. The communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing device and the other device may be in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link is based on a standardized or proprietary technology. The wireless link is based on Bluetooth technology (e.g. Bluetooth Low-Energy technology).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, e.g. less than 10 g.

The hearing device may comprise a forward or signal path between an input unit (e.g. an input transducer, such as a microphone or a microphone system and/or direct electric input (e.g. a wireless receiver)) and an output unit, e.g. an output transducer. The signal processor is located in the forward path. The signal processor is adapted to provide a frequency dependent gain according to a user's particular needs. The hearing device may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices comprise a digital-to-analogue (DA) converter to convert a digital signal to an analogue output signal, e.g. for being presented to a user via an output transducer.

The hearing device, e.g. the input unit, and/or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively, or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level (L) detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal is in the present context taken to include a speech signal from a human being. It may also include other forms of utterances generated by the human speech system (e.g. singing). The voice activity detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector is configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a trained neural network.

The hearing device may further comprise other relevant functionality for the application in question, e.g. compression, noise reduction, feedback control, etc.

The hearing device may comprise a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

Use:

In an aspect, use of a hearing device as described above, in the 'detailed description of embodiments' and in the claims, is moreover provided. Use may be provided in a system comprising audio distribution, e.g. a system comprising a microphone and a loudspeaker in sufficiently close proximity of each other to cause feedback from the loudspeaker to the microphone during operation by a user. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

The hearing system is adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices adapted to implement a binaural hearing system, e.g. a binaural hearing aid system.

A hearing system comprising left and right hearing devices according above is disclosed. The left and right hearing devices are configured to be worn in or at left and right ears, respectively, of said user, and/or to be fully or partially implanted in the head at left and right ears, respectively, of the user, and being configured to establish a wired or wireless connection between them allowing data, e.g. audio data, to be exchanged between them, optionally via an intermediate device.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP is configured to run on cellular phone, e.g. a smartphone, or on another portable device allowing communication with said hearing device or said hearing system.

Definitions:

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating (e.g. acoustically, electrically or optically) with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. to a multi-electrode array) for electrically stimulating the cochlear nerve (cochlear implant type hearing aid). The hearing device may comprise a speakerphone (comprising a number of input transducers and a number of output transducers), e.g. for use in an audio conference situation.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids, headsets, earphones, and/or ear protection devices.

Figure 1:
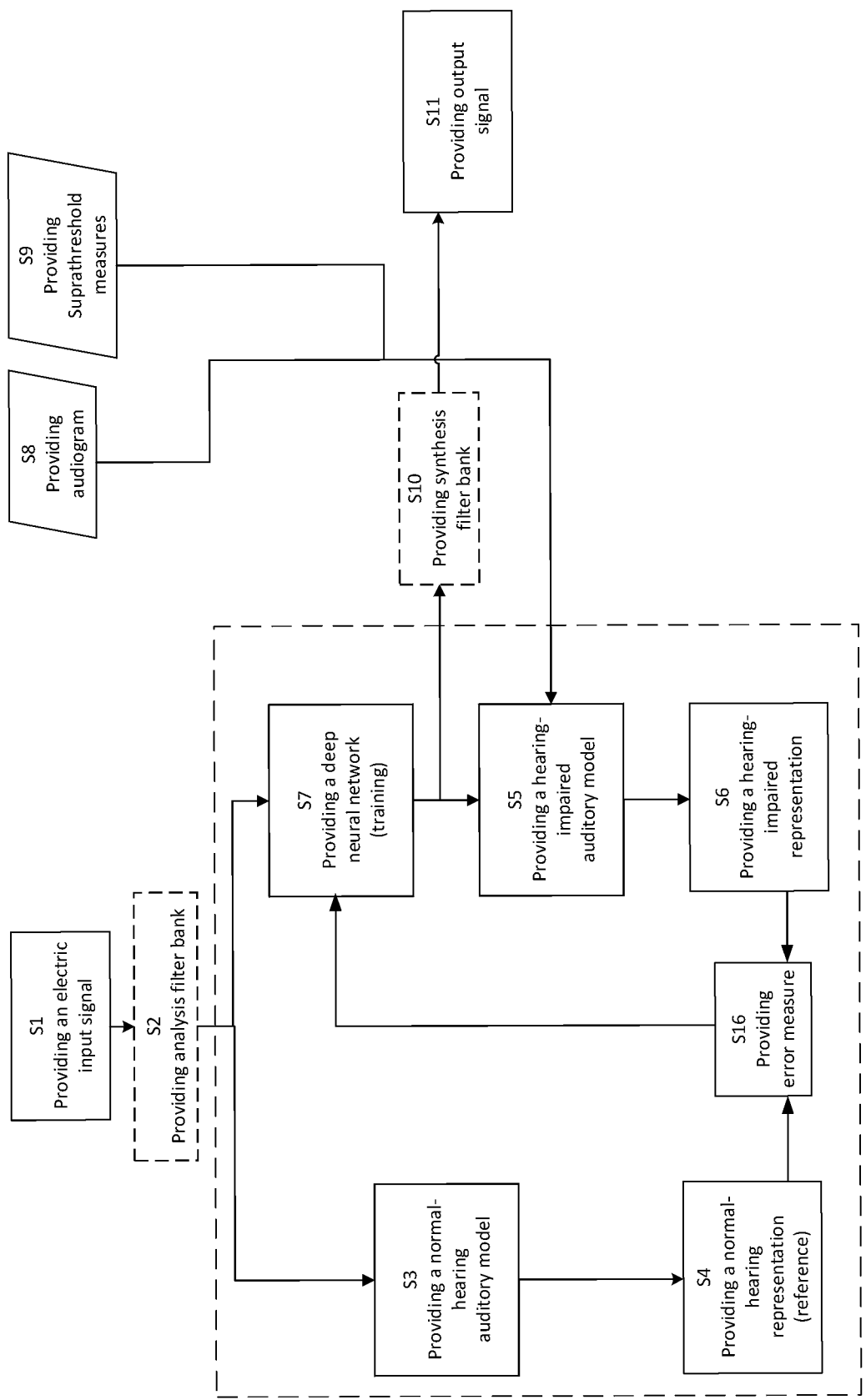
FIG. 1 shows an exemplary application scenario of training of a neural network for defining and setting the nonlinear signal processing of a hearing device system according to the present disclosure.

FIG. 1 shows an exemplary application scenario of training of a neural network for defining and setting the nonlinear signal processing of a hearing device system according to the present disclosure.

In FIG. 1, at least one electric input signal may be provided S1. The at least one electric input signal may represent at least one input sound signal from an environment of a hearing device user. The at least one input sound signal may comprise one or more speech signals from one or more sound sources and may comprise additional signal components, termed noise signal components, from one or more other sound sources. The electric input signal may be provided in the time domain as a waveform. The electric input signal may be provided by an input unit of the hearing device.

An analysis filter bank (and/or a Fourier transformation unit) may be provided S2. The at least one electric input signal may be provided to (and be processed by) the analysis filter bank (and/or the Fourier transformation unit). In the analysis filter bank, the electric input signal may be transformed into the frequency domain. The analysis filter bank may be configured for transforming the at least one electric input signal into a (frequency resolved) spectrum. The analysis filter bank may be arranged after the input unit of the hearing device.

Based on at least one electric input signal, either in the time or in the frequency domain, a normal-hearing representation may be determined S4. The determination of the normal-hearing representation may be based on a provided normal-hearing auditory model S3, as disclosed further above. The normal-hearing representation may be output in the form of an audiogram.

Based on at least one electric input signal, either in the time or in the frequency domain, an initial hearing-impaired representation may be determined S6. The determination of the hearing-impaired representation may be based on a provided hearing-impaired auditory model S5. The hearing-impaired representation may be output in the form of an audiogram.

The normal-hearing representation and the hearing-impaired representation may e.g. be provided to an error measure module for providing an error measure S16 (to determine a degree of matching).

On the basis of input comprising the electric input signal, the normal-hearing representation, and the hearing-impaired representation, optimized training parameters of a provided neural network S7 may be determined. As illustrated in FIG. 1, the neural network may be a deep neural network. The step of determining optimized training parameters of the neural network may result in signal processing parameters of the hearing device.

Auditory models have long been used as research tools and to explore the mechanisms of hearing and furthermore act as approximative frontends for further analysis and processing of sound signals for different purposes, e.g. [14].

There are two basic, different type of auditory models:

1) physiological that represent the different functional stages in the anatomy of the ear: outer ear, middle ear, inner ear: The inner ear is again described by the basilar membrane, outer hair cells, inner hair cells, synapses, spiral ganglion, auditory nerve, midbrain etc. These models have often been designed and validated using animal data, e.g. auditory nerve fiber recordings in the cat.

2) psychoacoustic (sometimes also called phenomenological) that are based on functional measures on the human ear, e.g. frequency masking, loudness growth etc. The advantage of this model is that it can be validated via different classical psychoacoustic tests. On the other hand, the output tends to be less rich/detailed than for the physiological model.

Depending on the type of auditory model, the representation may have different interpretations: In a physiological model, the representation may represent the auditory nerve output [7] or the midbrain (brainstem) neural activity [9]. In a psychoacoustic model, the representation may be an 'excitation pattern' [11] [13], akin to a masking pattern or a 'specific' loudness pattern, which is loudness divided into frequency bands [13] [14].

The training of the neural network may comprise iteratively performing the steps of adjusting the training parameters of the neural network and comparing the normal-hearing representation with the hearing-impaired representation to determine a degree of matching between the normal-hearing representation and the hearing-impaired representation. Adjusting the training parameters of the neural network may comprise adjusting the weights of the neural network.

For example, the training may comprise comparing an initial hearing-impaired audiogram with a normal-hearing audiogram by providing an error measure S16, and adjusting the training parameters of the neural network (and corresponding signal processing parameters of the hearing-impaired representation) repetitively, so that the hearing-impaired audiogram applied with the determined signal processing approaches the normal-hearing audiogram.

Based on comparing the normal-hearing representation with the hearing-impaired representation, a degree of matching between the normal-hearing representation and the hearing-impaired representation may be determined. For example, comparing may comprise comparing a normal-hearing audiogram with a hearing-impaired audiogram at corresponding electric input signal.

The training may be carried out until the degree of matching fulfills predetermined requirements. For example, predetermined requirements may refer to one or more predetermined values. For example, predetermined requirements may constitute that the deviation between the normal-hearing representation and the hearing-impaired representation in total (at all compared values, for example frequencies) must be below a predetermined value (such as <20%, <10%, <5%, <2%, or other). For example, predetermined requirements may constitute that the deviation between the normal-hearing representation and the hearing-impaired representation at each of the compared values (for example at each frequency) must be below a predetermined value (such as <20%, <10%, <5%, <2%, or other).

In FIG. 1, it is indicated that the steps S3, S4, S5, S6, S7, and S16 may be carried out in a unit (indicated by the dotted square). The unit may be a processing unit of the hearing device. The unit may also be a server, such as a cloud server, or a mobile device. Thereby, a server or mobile device may carry out the computationally heavy training, and the hearing device may receive a trained version of the neural network or the resulting signal processing parameters.

After the training has been completed on the basis of one electric input signal, the training may be repeated on the basis of one or more additional electric input signals, so that the neural network and corresponding signal processing parameters may be adjusted (finetuned) further so that the output signal to the hearing-impaired user is as close as possible to the audio signal as would be received by a normal-hearing user.

During the (initial) training of the neural network, i.e. before the hearing device user starts using the hearing device, the user may provide further audiological data for training the neural network. Providing further audiological data may comprise providing one or more audiograms S8, e.g. from the daily life (in the environment) of a hearing-impaired user, e.g. speech combined with many types of background noises, clean speech, music, etc. The one or more audiograms may be based on one or more of an age-related hearing loss, a noise induced hearing loss, an inherited hearing loss, a reverse slope hearing loss, and a cookie bite hearing loss.

Providing further audiological data may also comprise providing supra-threshold measures S9, e.g. broadened auditory filters, loss of cochlear compression or spectro-temporal modulation detection. The supra-threshold measures S9 may be represented as input parameters in the form of frequency-specific Q-values (vector of filter slopes), frequency-specific compression ratios (compression vector (CR) vector), scalar values e.g. spectro-temporal modulation threshold (dB) [6], or other.

Additionally, or alternatively, the neural network may be further trained based on the further audiological data after the hearing device user has started using the hearing device.

At the time when the degree of matching fulfills the predetermined requirements, corresponding signal processing parameters for the hearing device may be determined.

In case the electric input signal was provided to an analysis filter bank or was Fourier transformed, the output from the neural network may be provided to a synthesis filter bank S10. In the synthesis filter bank, the output from the neural network may be transformed back to the time domain.

Based on the output from the neural network (the processed version of the at least one electric input signal) or the output from the synthesis filter bank, at least one output signal representing stimuli perceivable by a hearing device user as sound is provided S11.

Figure 2:
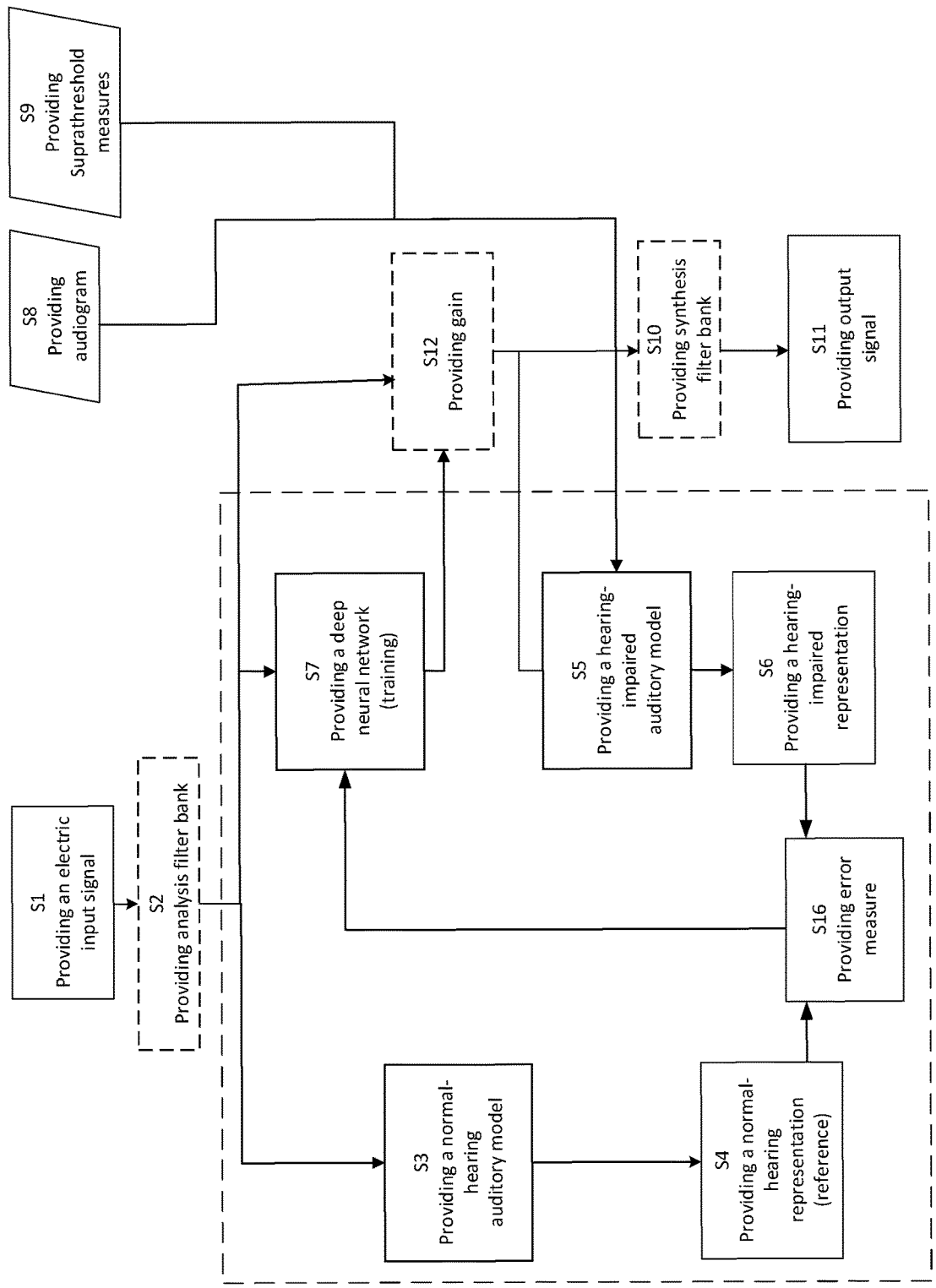
FIG. 2 shows an exemplary application scenario of training of a neural network for defining and setting the nonlinear signal processing of a hearing device system according to the present disclosure.

FIG. 2 shows an exemplary application scenario of training of a neural network for defining and setting the nonlinear signal processing of a hearing device system according to the present disclosure.

The main part of the steps of the training the neural network as disclosed in FIG. 1 are similar to the steps of the training disclosed in FIG. 2. Accordingly, reference is made to the description of FIG. 1 above.

FIG. 2 differs from FIG. 1 by providing gain S12, by a gain module, or alternatively providing a mask e.g. to the processed versions of said at least one electric input signal.

As shown, the mask or gain module may receive input directly from the analysis filter bank and/or from the neural network. The neural network may estimate the gain as a time-varying gain, whereby a time-varying gain may be provided for hearing loss compensation. The neural network may estimate the mask as a time-frequency mask which may then be applied to the frequency resolved electric input signal (spectrum) also during training of the neural network. The mask or gain module may be arranged prior to the output unit of the hearing device. The mask or gain module may be arranged prior to a synthesis filter bank. Therefore, the mask or gain module may be applied on the adjusted hearing-impaired representation during training of the neural network. Further, the mask or gain module may be applied on the processed signal from the neural network to the synthesis filter bank and to the output unit of the hearing device.

Further, the method of the exemplary application scenario of FIG. 2 may further comprise providing a standard hearing aid multichannel compression or other standard hearing aid algorithms. The standard hearing aid multichannel compression or other standard hearing aid algorithms may be provided prior to or after the gain module (or time-frequency mask). Thereby, the neural network and the mask and/or gain module may be providing the unknown 'rest' of the required time-frequency processing.

Figure 3:
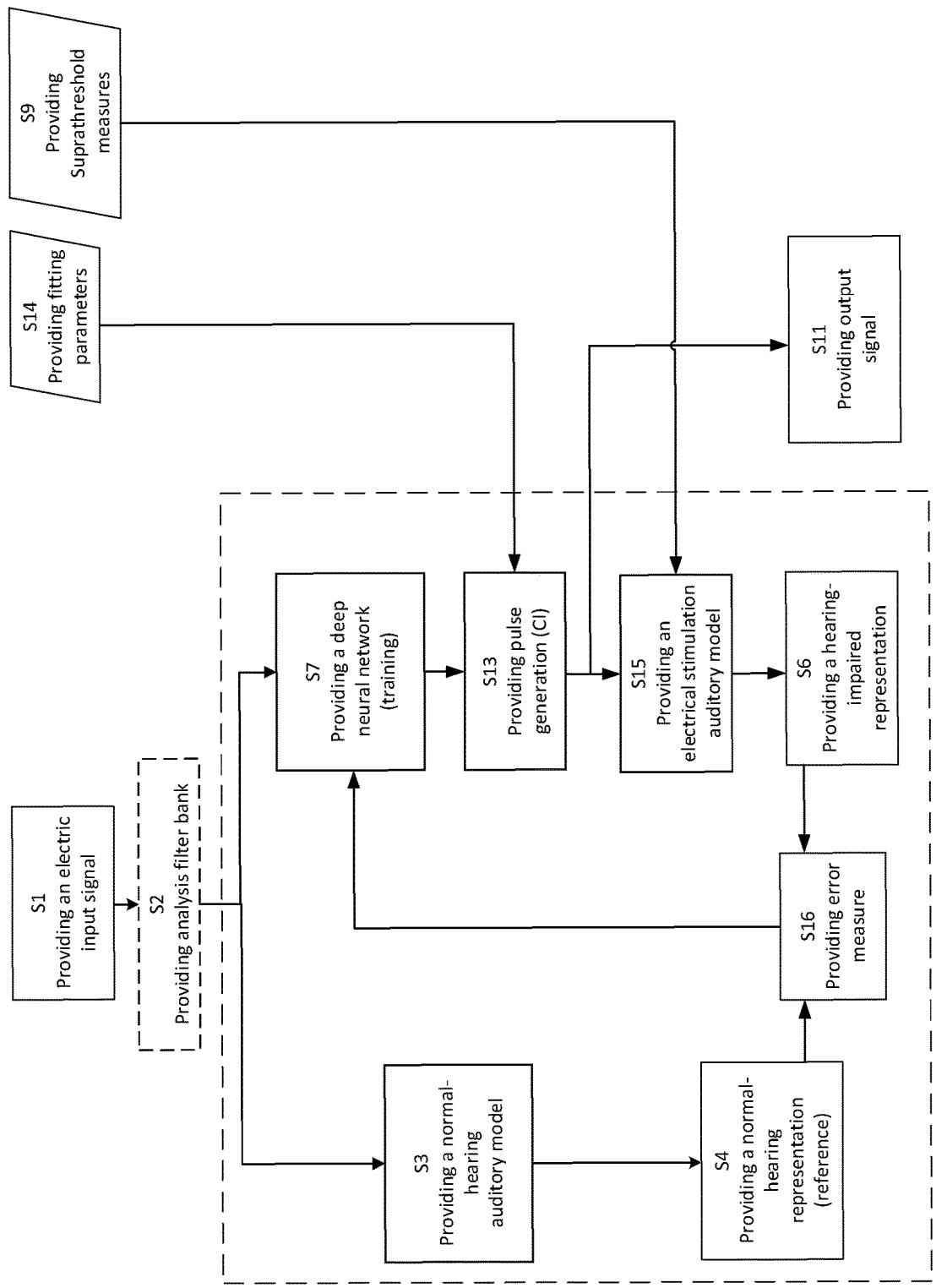
FIG. 3 shows an exemplary application scenario of training of a neural network for defining and setting the nonlinear signal processing of a hearing device system according to the present disclosure.

FIG. 3 shows an exemplary application scenario of training of a neural network for defining and setting the nonlinear signal processing of a hearing device system according to the present disclosure.

The main part of the steps of the training the neural network as disclosed in FIG. 1 and FIG. 2 are similar to the steps of the training disclosed in FIG. 3. Accordingly, reference is made to the description of FIG. 1 and FIG. 2 above.

FIG. 3 differs from FIG. 1 and FIG. 2 by providing a model for electrical stimulation, e.g. [16], instead of the hearing-impaired auditory model. A model for electrical stimulation may e.g. be used in the case where the hearing device is a cochlear implant.

The input to such a model may be electrical current and hence the cochlear implant itself needs to be included in the system to provide the transduction from acoustic to electric stimulation with the pulse coding strategy and audio signal processing. The cochlear implant may be fitted by fitting parameters. The model may be set up to simulate the hearing of the individual (e.g. electrical hearing threshold and discomfort level of the user, which are standard measures), but otherwise the training and optimization procedure may be similar to in FIG. 1 and FIG. 2.

Accordingly, in FIG. 3, pulse generation may be provided S13 by a cochlear implant. The cochlear implant for pulse generation may be fitted by provided fitting parameters S14 (e.g. hearing level, uncomfortable level, etc.). The fitting parameters may be based on one or more of an age-related hearing loss, a noise induced hearing loss, an inherited hearing loss, etc. The pulse generation may be provided to a provided electrical stimulation auditory model S15. The electrical stimulation auditory model may further be provided with supra-threshold measures. A hearing-impaired representation may be provided S6 based on the electrical stimulation auditory model.

When the degree of matching (e.g. when the provided error measure S16) fulfills the predetermined requirements, an output signal may be provided S11.

Figure 4:
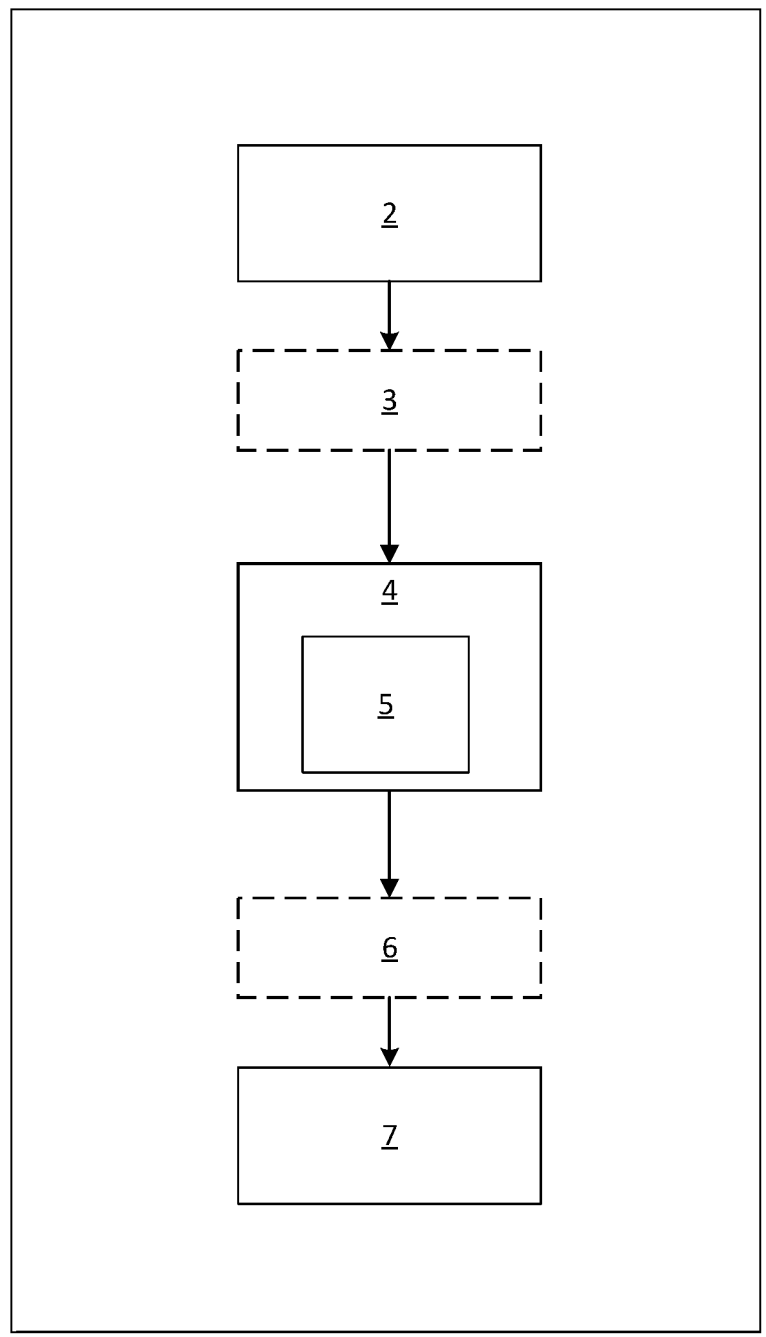
FIG. 4 shows an exemplary application scenario of a hearing device according to the present disclosure.

FIG. 4 shows an exemplary application scenario of a hearing device according to the present disclosure.

In FIG. 4, the hearing device 1, which may be a hearing aid, adapted to be worn in or at an ear of a user, and/or to be fully or partially implanted in the head of the user is shown.

The hearing device 1 may comprise an input unit 2 for receiving an input sound signal from an environment of the hearing device user and providing at least one electric input signal representing said input sound signal.

The hearing device 1 may comprise an analysis filter bank 3. In the analysis filter bank 3, the at least one electric input signal may be transformed into the frequency domain. Accordingly, the analysis filter bank 3 may be configured to transform the at least one electric input signal into a (frequency resolved) spectrum.

A processing unit 4 of the hearing device 1 may be connected to said input unit 2, e.g. via the analysis filter bank 3. The processing unit 4 may comprise a trained version of the neural network. In FIG. 4, it is shown that the neural network may be a deep neural network 5. When the neural network is trained (has finished the initial training), the parameters of the neural network is optimized and fixed. The processing unit 4 (and the hearing device 1) may be configured to determine corresponding signal processing parameters of the hearing device 1 based on the fixed training parameters of the neural network. Further, the processing unit 4 (and the hearing device 1) may be configured to provide a processed version of said at least one electric input signal (i.e. a processed signal) from the input unit 2, e.g. via the analysis filter bank 3.

The processing unit 4 (and the hearing device 1) may be configured to provide the processed version of said at least one electric input signal to an output unit 7 of the hearing device 1, e.g. via a synthesis filter bank 6. The output unit 7 may be configured to convert said processed signal or a signal originating therefrom to at least one set of stimuli perceivable as sound to the hearing device user.

Figure 5:
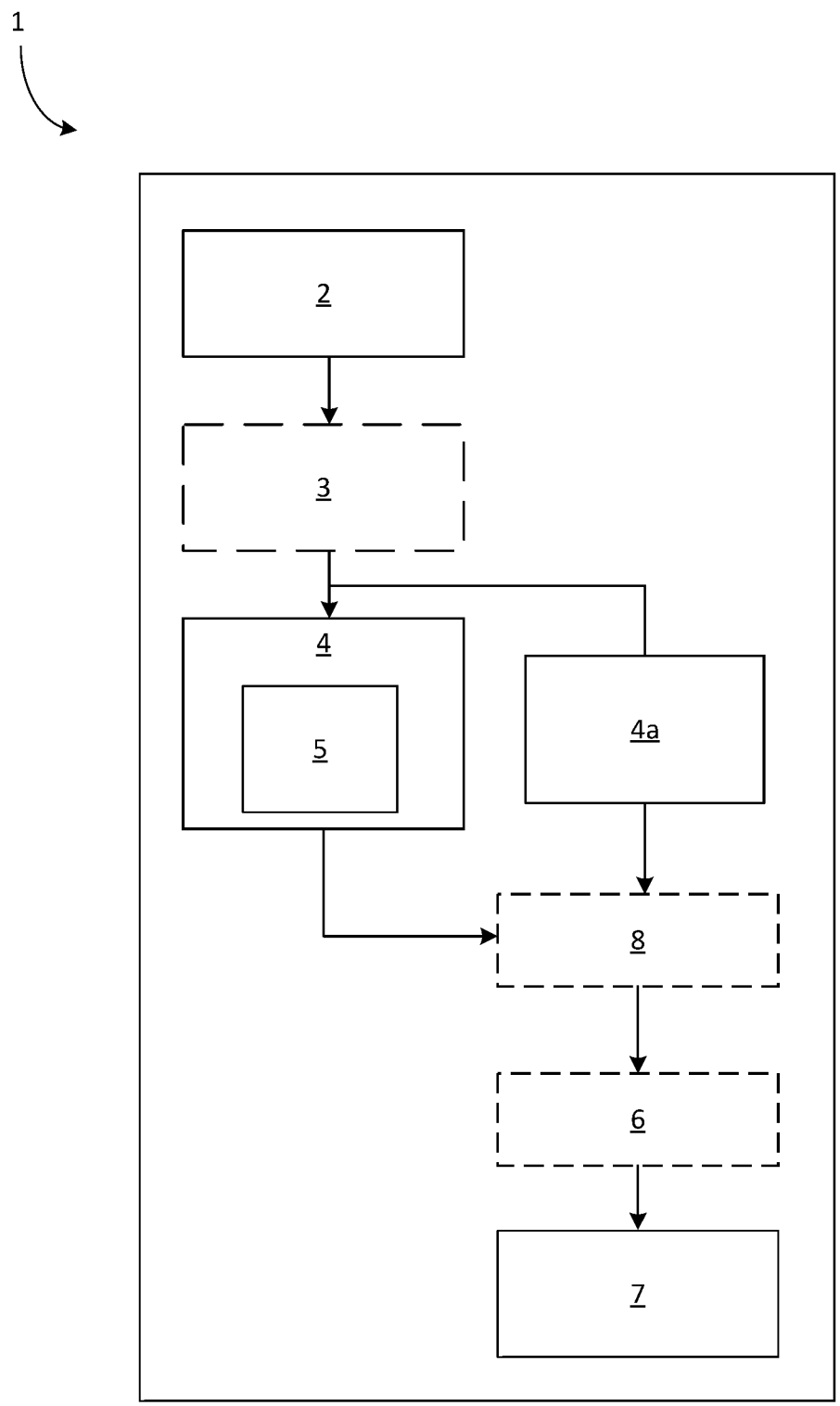
FIG. 5 shows an exemplary application scenario of a hearing device according to the present disclosure.

FIG. 5 shows an exemplary application scenario of a hearing device according to the present disclosure.

The main parts of the hearing device 1 as disclosed in FIG. 5 are similar to the parts of the hearing device 1 as disclosed in FIG. 4. Accordingly, reference is made to the description of FIG. 4 above.

FIG. 5 differs from FIG. 4 by applying a gain module 8 or a mask.

As shown, the gain module 8 or mask may receive input directly from the analysis filter bank 3 and/or from the neural network (the deep neural network 5). The neural network may estimate a non-linear time-varying gain of the gain module 8.

The neural network may estimate the mask as a time-frequency mask which may then be applied to the frequency resolved electric input signal (spectrum) also during training of the neural network, as described above.

Accordingly, the processing unit 4 (and the hearing device 1) may be configured to apply the gain module 8 or mask on the processed signal from the neural network to the output unit 7 of the hearing device 1, via the synthesis filter bank 3.

Alternatively, instead of applying the processing unit 4, which comprises the deep neural network 5, a traditional hearing device processing unit 4a may be applied.

Figure 6:
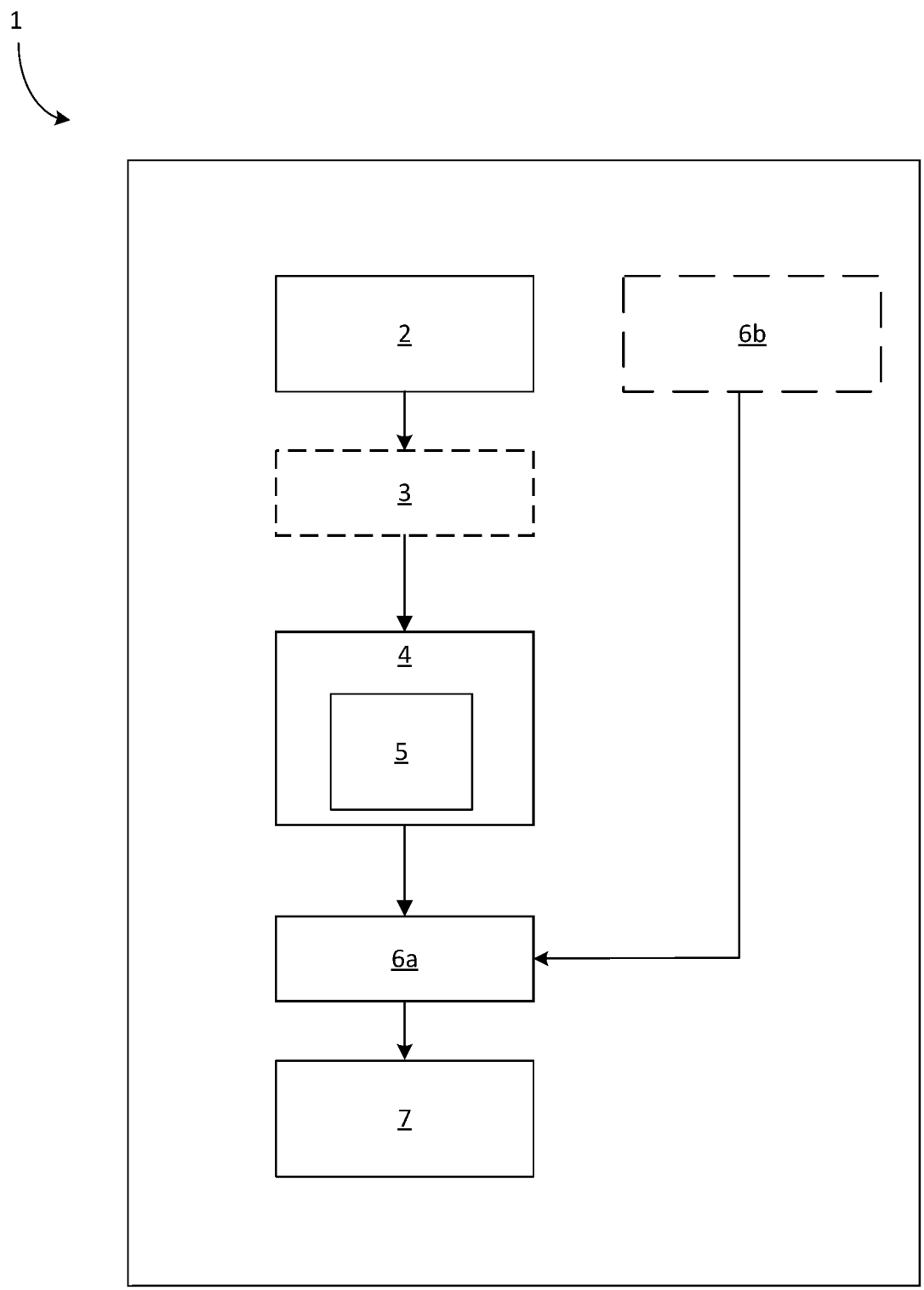
FIG. 6 shows an exemplary application scenario of a hearing device according to the present disclosure.

FIG. 6 shows an exemplary application scenario of a hearing device according to the present disclosure.

The main parts of the hearing device 1 as disclosed in FIG. 6 are similar to the parts of the hearing device 1 as disclosed in FIG. 4 and FIG. 5. Accordingly, reference is made to the description of FIG. 4 and FIG. 5 above.

FIG. 6 relates to a case where the hearing device may be a cochlear implant. Accordingly, FIG. 6 differs from FIG. 4 and FIG. 5 by applying a pulse generation module 6a instead of a synthesis filter bank 6. The pulse generation module 6a may optionally be fitted by fitting parameters 6b. The output unit 7 may accordingly e.g. provide an enhanced pulse train as output signal.

Figure 7:
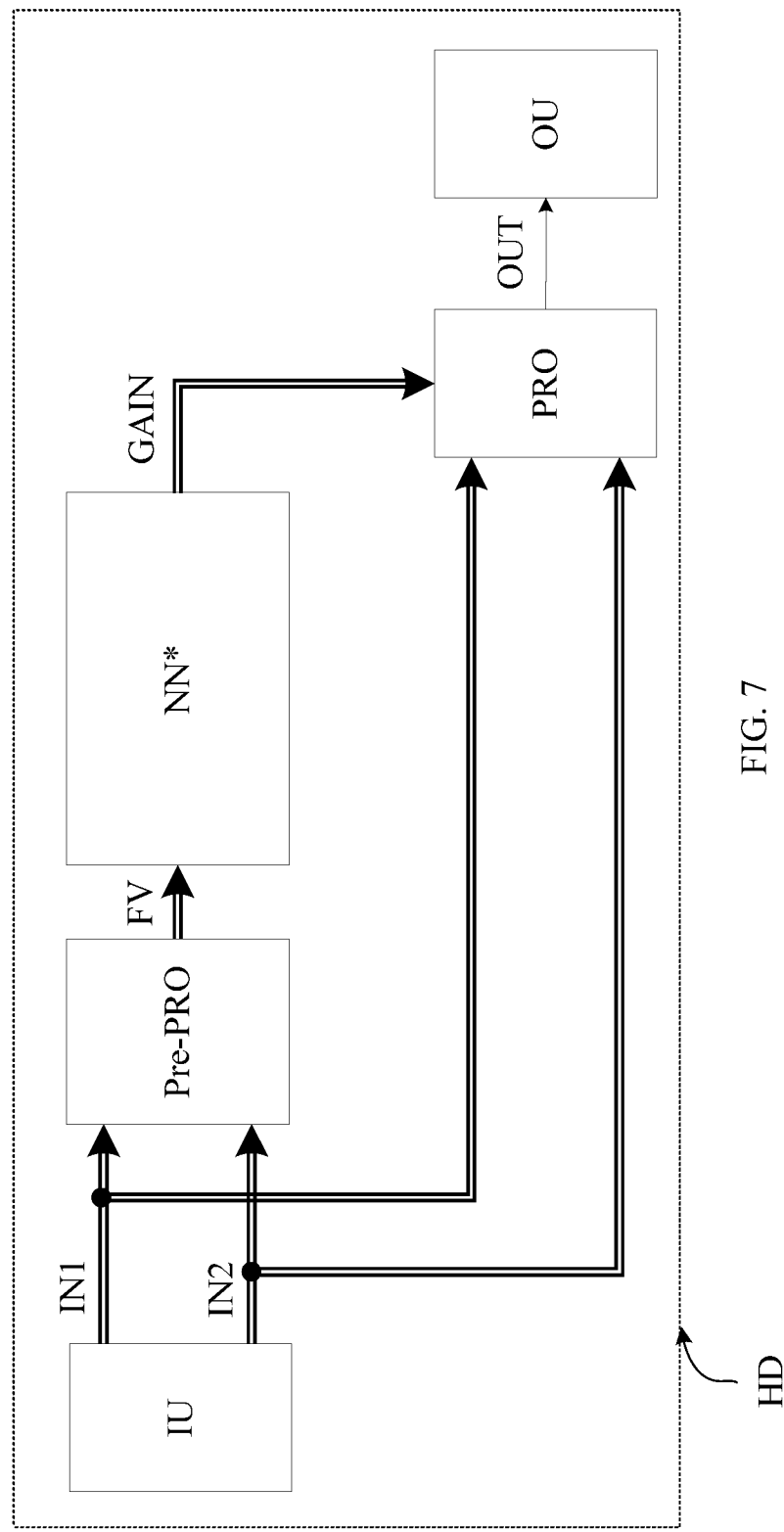
FIG. 7 shows a hearing device according to an embodiment of the present disclosure using a trained (personalized to a particular user) neural network to control processing of signals representing sound in the hearing device before processed signals are presented to the user wearing the hearing device.

FIG. 7 shows a hearing device (HD) according to an embodiment of the present disclosure using a trained neural network (NN*) (personalized to a particular user as described in the present disclosure) to control processing of signals representing sound in the hearing device before processed signals are presented to the user wearing the hearing device. The hearing device (HD) comprises an input unit (IU) providing electric input signals (IN1, IN2), e.g. from respective microphones (M1, M2). The input unit (IU) comprises e.g. respective analysis filter banks (filter banks) to provide the electric input signals (IN1, IN2) in a frequency sub-band representation (k,m), k and m being frequency and time indices, respectively. The Hearing device may comprise a pre-processor (Pre-Pro) receiving (at least one of) the electric input signals (IN1, IN2) and for preparing an appropriate input vector (FV) to the neural network (NN*). The input vector (FV) may comprise one or more time frames of the electric input signal(s) or a processed version thereof (e.g. extracted features of one said signals). The output signal GAIN of the optimized neural network (NN*) is fed to a processor (PRO) of the hearing device. The processor (PRO) receives the electric input signals (IN1, IN2) from the input unit (IU) (or a beamformed version thereof) and processes the signals in dependence of the output GAIN of the neural network (NN*). The output signal GAIN may e.g. represent time dependent gains G (e.g. time and frequency dependent gains, G(k,m)) to be applied to a signal of the forward path, e.g. to one of the electric input signals (IN1, IN2) or a spatially filtered version thereof. Based thereon, the processor (PRO) provides a processed output (OUT) which is fed to an output unit (OU), e.g. comprising an output transducer, e.g. a loudspeaker or a vibrator, for presentation of stimuli perceivable as sound to the user of the hearing device. The output unit (OU) (or the processor) may comprise a synthesis filter bank (inverse filter bank) for converting a frequency sub-band signal to a time domain signal before being presented to the output transducer.

Figure 8:
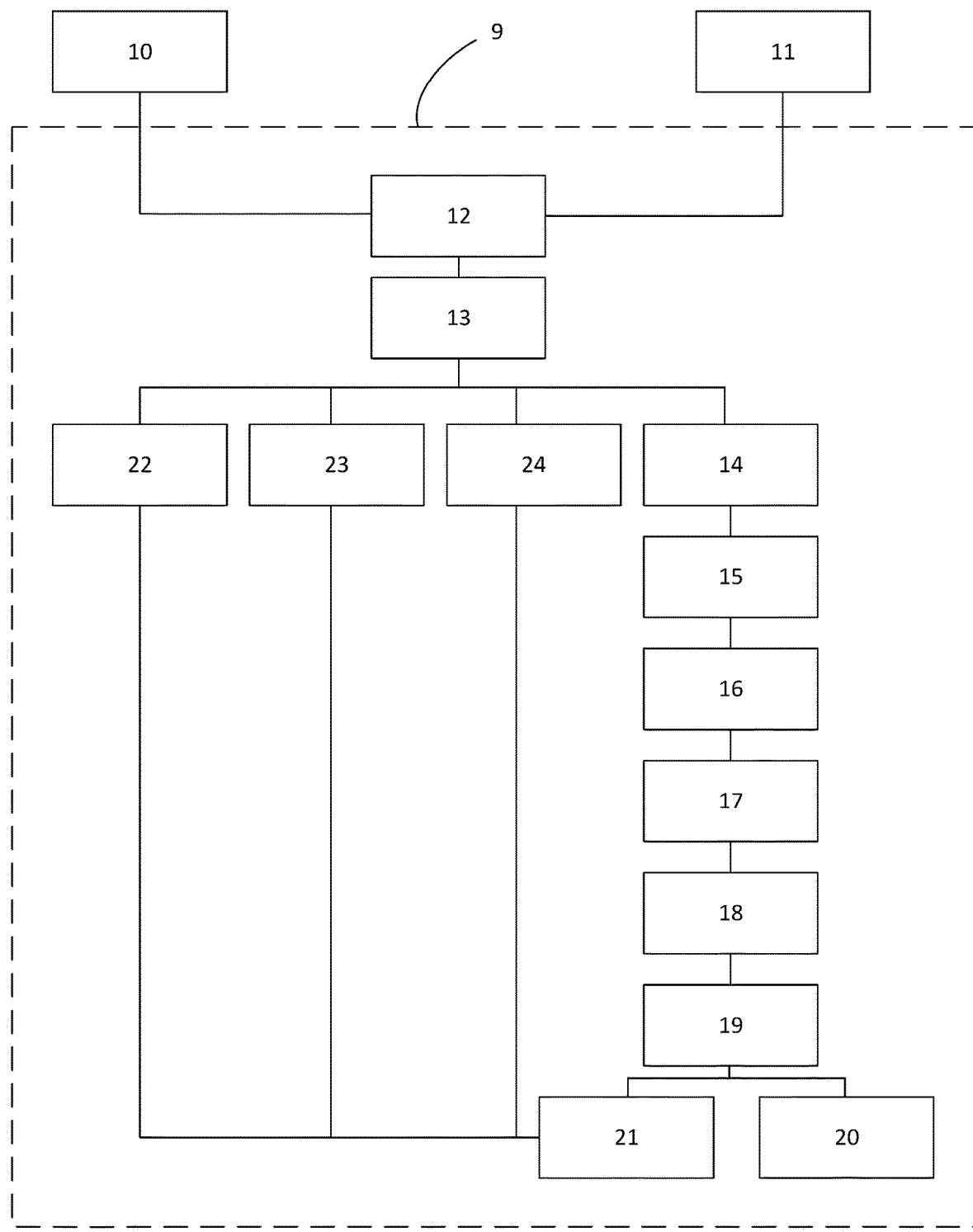
FIG. 8 shows an exemplary application scenario of an auditory model for providing a normal-hearing or hearing-impaired representation.

FIG. 8 shows an exemplary application scenario of an auditory model for providing a normal-hearing or hearing-impaired representation.

In FIG. 8, an auditory model module 9 may receive input parameters via an input module 10 and may provide an output via an output module 11.

The input parameters may comprise an audiogram, an auditory filter bandwidth, a cochlear compression measurement, and/or a sound file.

The auditory model module 9 may comprise a control module 12 for controlling the input parameters. The control module 12 may be configured to check that all input parameters are set correctly. When one or more of the input parameters are not set correctly, a default value may be set to ensure a correct functioning of the auditory model.

The auditory model module 9 may further comprise an assembly module 13. The assembly module 13 may be configured to assemble/collect one or more functions of the auditory model. The assembly module 13 may be configured to receive the results of the (one or more functions of the) auditory model. The assembly module 13 may be configured to output and/or transmit the received results to the output module 11.

The one or more functions of the auditory model, which may be assembled/collected by the assembly module 13 may comprise the modules of:

A read module 14 configured to read sound signals and to provide a matrix. The rows of the matrix may be the size of the desired input frame size and the columns may be controlled by the size of the sound signal file and the desired input frame size. The output of this function may be arranged in a way that it saves each frame row-vise in a matrix form. This means that the first input frame may be the first row of the matrix, the second frame may be the second row of the matrix, etc.

A power spectrum module 15 configured to calculate a power spectrum of one frame at a time. For example, the power spectrum may be calculated by first applying a Hann-window to the time signal, and then converting it into frequency by calculating the Fast Fourier Transform (FFT) of the time signal. Hereby, the power spectrum of the first half of the FFT output may be calculated. The power spectrum of the first half may be used in order to get rid of the mirror frequency components generated by the FFT.

A first correction spectrum module 16 configured to correct the power spectrum to the acoustical field.

A second correction spectrum module 17 configured to correct the power spectrum for equal loudness contours (e.g. the equivalent of the outer and the middle ear transfer function).

An equivalent rectangular bandwidth (ERB) energy module 18 configured to calculate the energy in each ERB band (no overlap). This function may also calculate the ERB for each frame and save it into a vector. The vector for each frame may be saved row-vise, so that it may contain a matrix in the end.

An excitation pattern module 19 configured to calculate excitation patterns, on basis of the ERB energy module 18 output. This module 19 may store the excitation patterns for each frame, which means that the final output may be expected as a matrix-form.

An excitation level module 20 configured to output the total excitation level at each frame.

A loudness module 21 configured to calculate both the specific loudness in a frame and a loudness vector, which may be done on the basis of output from the excitation pattern module 19, and also on the basis of output from a sound pressure level (SPL) module 22, a hearing threshold level (HTL) module 23, and an uncomfortable level (UCL) module 24.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[1] Goodfellow, I., Bengio, Y., and Courville, A. (2016). Deep Learning, MIT Press.

[2] Bengio, Y. (2009). "Learning Deep Architectures for AI," Found. Trends® Mach. Learn., doi: 10.1561/2200000006. doi:10.1561/2200000006.

[3] Kun, Z., Yu, J., Wang, R., Li, C., and Tao, D. (2015). "Coupled Deep Autoencoder for Single Image Super-Resolution," IEEE Trans. Cybern., 47, 1-11.

[4] Stone, M. A., Glasberg, B. R., and Moore, B. C. J. (1992). "Simplified measurement of impaired auditory filter shapes using the notched-noise method," Br. J. Audiol., 26, 329-334.

[5] Jepsen, M. L., and Dau, T. (2011). "Characterizing auditory processing and perception in individual listeners with sensorineural hearing loss," J. Acoust. Soc. Am., 129, 262-281. doi:10.1121/1.3518768.

[6] Bernstein, J. G. W., Mehraei, G., Shamma, S., Gallun, F. J., Theodoroff, S. M., and Leek, M. R. (2013). "Spectrotemporal modulation sensitivity as a predictor of speech intelligibility for hearing-impaired listeners," J. Am. Acad. Audiol., 24, 293-306. doi:10.3766/jaaa.24.4.5.

[7] Zilany, M. S. A., and Bruce, I. C. (2006). "Modeling auditory-nerve responses for high sound pressure levels in the normal and impaired auditory periphery," J. Acoust. Soc. Am., 120, 1446-1466. doi:10.1121/1.2225512.

[8] Jepsen, M. L., and Dau, T. (2011). "Characterizing auditory processing and perception in individual listeners with sensorineural hearing loss," J. Acoust. Soc. Am., 129, 262-281. doi:10.1121/1.3518768.

[9] Carney, L. H. (2017). "Fluctuation Contrast and Speech-on-Speech Masking: Model Midbrain Responses to Simultaneous Speech," Proc. Int. Symp. Audit. Audiol. Res., 6, 75-82.

[10] Chen, Zhangli, Guangshu Hu, Brian R. Glasberg, and Brian C J Moore. "A new method of calculating auditory excitation patterns and loudness for steady sounds." Hearing research 282, no. 1-2 (2011): 204-215.

[11] Bisgaard, Nikolai, Marcel S. M. G. Vlaming, and Martin Dahlquist. "Standard Audiograms for the IEC 60118-15 Measurement Procedure." Trends in Amplification 14, no. 2 (June 2010): 113-20. doi:10.1177/1084713810379609.

[12] Hohmann, V. (2002). Frequency analysis and synthesis using a Gammatone filterbank. Acta Acustica united with Acustica, 88(3), 433-442.

[13] Fastl, H., and Zwicker, E. (2007). Psychoacoustics, Psychoacoustics Facts Model., Springer Berlin Heidelberg, Berlin, Heidelberg. doi:10.1007/978-3-540-68888-4.

[14] Bramsløw, L. (2004). "An Objective Estimate of the Perceived Quality of Reproduced Sound in Normal and Impaired Hearing," Acta Acust. united with Acust., 90, 1007-1018.

[15] Moore, B. C. J., Glasberg, B. R., and Stone, M. A. (2004). "New version of the TEN test with calibrations in dB HL," Ear Hear., doi: 10.1097/

01.aud.0000145992.31135.89. doi:10.1097/01.aud.0000145992.31135.89

[16] Grange, J. A., Culling, J. F., Harris, N. S. L., and Bergfeld, S. (2017). "Cochlear implant simulator with independent representation of the full spiral ganglion," J. Acoust. Soc. Am., doi: 10.1121/1.5009602. doi:10.1121/1.5009602

The invention claimed is:

1. A method of defining and setting a nonlinear signal processing of a hearing device by machine learning, the hearing device being configured to be worn by a user at or in an ear or to be fully or partially implanted in the head at an ear of the user, the method comprising:
providing at least one electric input signal representing at least one input sound signal from an environment of a hearing device user,
determining a normal-hearing representation of said at least one electric input signal based on a normal-hearing auditory model,
determining a hearing-impaired representation of said at least one electric input signal based on a hearing-impaired auditory model,
determining optimised training parameters by machine learning, where determining optimised training parameters comprises iteratively
adjusting the training parameters, and
comparing the normal-hearing representation with the hearing-impaired representation to determine a degree of matching between the normal-hearing representation and the hearing-impaired representation,
until the degree of matching fulfils predetermined requirements, and,
when the degree of matching fulfils the predetermined requirements, determining corresponding signal processing parameters of the hearing device based on the optimised training parameters,
wherein the method further comprises providing at least one supra-threshold measure comprising customized measurements as input to the hearing-impaired auditory model, and wherein determining a hearing-impaired representation of said at least one electric input signal is further based on said at least one supra-threshold measure.

2. The method according to claim 1, wherein providing at least one electric input signal comprises providing a plurality of electric input signals.

3. The method according to claim 1, wherein the method further comprises transforming the electric input signal into a spectrum.

4. The method according to claim 1, wherein the signal processing parameters comprise gain, noise reduction, enhancement, and/or other signal processing parameters.

5. The method according to claim 1, wherein determining optimised training parameters by machine learning comprises determining optimised training parameters of a neural network by training the neural network, and where the neural network is a deep neural network.

6. The method according to claim 5, wherein the deep neural network comprises an auto-encoder.

7. The method according to claim 1, wherein said at least one supra-threshold measure comprises broadened auditory filters, loss of cochlear compression, and/or spectro-temporal modulation detection.

8. The method according to claim 1, wherein the normal-hearing auditory model and the hearing-impaired auditory model are based on the same auditory model.

9. The method according to claim 1, wherein the method further comprises providing at least one audiogram, and where determining a hearing-impaired representation of said at least one electric input signal is further based on said at least one audiogram.

10. The method according to claim 9, wherein the at least one audiogram comprises hearing device user specific and/or generic audiograms.

11. The method according to claim 1, wherein the hearing-impaired auditory model is based on the normal-hearing auditory model.

12. A hearing device adapted to be worn in or at an ear of a user, and/or
to be fully or partially implanted in the head of the user, comprising
an input unit for receiving an input sound signal from an environment of a hearing device user and providing at least one electric input signal representing said input sound signal; and
an output unit for providing at least one set of stimuli perceivable as sound to the user based on processed versions of said at least one electric input signal,
a processing unit connected to said input unit and to said output unit and comprising signal processing parameters of the hearing device to provide processed versions of said at least one electric input signal, where said signal processing parameters are determined based on optimized training parameters determined according to the method of claim 1.

13. The hearing device according to claim 12, wherein the processing unit comprises a deep neural network providing the optimized training parameters.

14. The hearing device according to claim 12, wherein the hearing device is configured to be further trained based on audio representing sound in an environment of the user.

15. The hearing device according to claim 12, wherein the hearing device comprises an analysis filter bank for transforming the electric input signal into a spectrum.

16. The hearing device according to claim 15, wherein the hearing device comprises a synthesis filter bank for transforming the spectrum into a time-domain signal.

17. The hearing device according to claim 12, wherein the hearing device comprises a mask and/or gain module.

18. A hearing device according to claim 12 constituting or comprising a hearing aid, a headset, an earphone, an ear protection device or a combination thereof.

19. A hearing system comprising left and right hearing devices according to claim 12, where the left and right hearing devices are configured to be worn in or at left and right ears, respectively, of said user, and/or to be fully or partially implanted in the head at left and right ears, respectively, of the user, and being configured to establish a wired or wireless connection between them allowing data to be exchanged between them, optionally via an intermediate device.

20. A non-transitory computer readable medium storing a computer program comprising instructions which, when the program is executed by
a computer, cause the computer to carry out the method of claim 1.

* * * * *